(12) United States Patent
Russ

(10) Patent No.: US 12,384,521 B2
(45) Date of Patent: Aug. 12, 2025

(54) ELECTRIC MOTOR PROPELLER SYSTEM

(71) Applicant: Jonathan Christian Russ, Poway, CA (US)

(72) Inventor: Jonathan Christian Russ, Poway, CA (US)

( * ) Notice: Subject to any disclaimer, the term of this patent is extended or adjusted under 35 U.S.C. 154(b) by 0 days.

(21) Appl. No.: 18/070,404

(22) Filed: Nov. 28, 2022

(65) Prior Publication Data

US 2024/0174348 A1 May 30, 2024

(51) Int. Cl.

| | |
|---|---|
| *B64C 11/06* | (2006.01) |
| *B64C 11/04* | (2006.01) |
| *B64D 27/24* | (2024.01) |
| *B64U 50/19* | (2023.01) |
| *F04D 19/00* | (2006.01) |
| *F04D 25/06* | (2006.01) |
| *F04D 29/32* | (2006.01) |
| *F04D 29/34* | (2006.01) |
| *F04D 29/64* | (2006.01) |

(52) U.S. Cl.
CPC .............. *B64C 11/06* (2013.01); *B64C 11/04* (2013.01); *B64D 27/24* (2013.01); *F04D 25/0646* (2013.01); *F04D 29/329* (2013.01); *F04D 29/34* (2013.01); *F04D 29/646* (2013.01); *B64U 50/19* (2023.01); *F04D 19/002* (2013.01); *F04D 25/0613* (2013.01); *F04D 25/064* (2013.01); *F04D 29/325* (2013.01)

(58) Field of Classification Search
CPC .............. F04D 25/0613; F04D 25/062; F04D 25/0626; F04D 25/0633; F04D 25/064; F04D 25/0646; F04D 25/088; F04D 19/002; F04D 29/322; F04D 29/323; F04D 29/325; F04D 29/329; F04D 29/362; F04D 29/34; F04D 29/36; F04D 29/601; F04D 29/646; B64C 11/04; B64C 11/06; B64C 27/24; B64U 50/19
See application file for complete search history.

(56) References Cited

U.S. PATENT DOCUMENTS

| | | | | |
|---|---|---|---|---|
| 4,692,096 | A * | 9/1987 | Yang | .................... F04D 25/0646 |
| | | | | 416/170 R |
| 4,850,799 | A * | 7/1989 | Bucher, Sr. | ............ F04D 25/088 |
| | | | | 416/170 R |
| 6,062,820 | A * | 5/2000 | Wang | ...................... F04D 29/34 |
| | | | | 416/220 A |
| 2017/0305538 | A1* | 10/2017 | Iskrev | .................... B64C 39/024 |
| 2017/0370367 | A1* | 12/2017 | Horng | ................. F04D 29/0513 |
| 2022/0140710 | A1* | 5/2022 | Wishart | .................... H02K 7/14 |
| | | | | 310/75 R |
| 2022/0239187 | A1* | 7/2022 | Wishart | ................. H02K 21/24 |

FOREIGN PATENT DOCUMENTS

CN 107878747 A * 4/2018 ............. B64U 50/19

OTHER PUBLICATIONS

English machine translation of CV 107878747 A, Jul. 28, 2023.*

* cited by examiner

*Primary Examiner* — Christopher Verdier
(74) *Attorney, Agent, or Firm* — Donn K. Harms

(57) ABSTRACT

An electric motor system for powering a propeller has a central shaft engageable to a mount on an aircraft around which an annular housing rotates. The annular housing is engaged with propeller blades using blade mounts connected to the annular housing directly or upon brackets. The brackets are removably engageable with the annular housing to provide for change or repair of propeller blades.

18 Claims, 9 Drawing Sheets

ELECTRIC MOTOR PROPELLER SYSTEM

BACKGROUND OF THE INVENTION

1. Field of the Invention

The present invention relates generally to electric motors. More particularly, it relates to an electric motor system having a configuration with a stationary axial-positioned stator and a rotating annular housing surrounding the stator forming a rotor. The disclosed motor is especially well adapted for employment in combination with blade mounts and propellers engaged thereto to provide power to piloted and unmanned aerial vehicles such as drones and vertical take-off and landing (eVTOL) aircraft.

2. Prior Art

Electric motors are employed throughout the world to provide rotational power from electric energy communicated to the electric motor. Whether such electric motors are brushless or operate with brushes, electric motors essentially perform the same function. They convert electric current into rotational motion and their physical construction and operation are well known.

A simple direct current electric motor has a stationary set of magnets in the stator and it has an armature with one or more windings of insulated wire wrapped around a soft iron core that concentrates the magnetic field. The windings usually have multiple turns around the core, and in large motors, there can be several parallel current paths. The ends of the wire winding are connected to a commutator. The commutator allows each armature coil to be energized in sequence and connects the rotating coils with the external power supply through brushes. The sequence of turning a particular coil on or off dictates what direction the effective electromagnetic fields are pointed. By turning on and off coils, in sequence, a rotating magnetic field can be created. These rotating magnetic fields interact with the magnetic fields of the magnets (permanent or electromagnets) in the stationary part of the motor (stator) to create a torque on the armature which causes it to rotate. In some DC motor designs, the stator fields use electromagnets to create their magnetic fields which allows greater control over the motor.

The primary difference between brushed and brushless electric motors is that brushed motors are mechanically driven and brushless are electronically driven. The operation and structure internally of electric motors to generate magnetic fields from electricity to thereby generate powered rotation of a rotor is well known in the art.

In electric motors which employ brushes, the stator, which is conventionally considered the stationary component contains permanent magnets while the rotor, which is conventionally considered the moving or rotating part, contains electromagnets. In operation the electric motor converts electrical energy into mechanical energy by creating a magnetic field that is powered by direct current. When a DC motor is powered, a magnetic field is created in its stator. The field attracts and repels magnets on the rotor which causes the rotor to rotate. To keep the rotor continually rotating, a commutator is attached to brushes connected to the electric power supply and interfaces with the motor's wire windings.

In designs of a brushless electric motor design, a permanent magnet operatively positioned on the rotor or moving component, has a coil-wound stator or stationary component. Thus, the operation is reversed as the stator creates the electromagnetic field to cause powered rotation. This design of a DC electric motor removes the need for brushes. The benefit of a brushless electric or DC motor is the elimination of wear and tear of brushes since very little heat is produced by the rotating magnet.

Instead of brushes communicating the electric current an electronic controller creates a three-phase variable electric current that powers the coils of the motor in a sequential manner. This forms a rotating magnetic field within the annular stator, which energizes the magnets of the axial positioned rotor and creates the spinning motion of the centrally positioned rotor. As noted, in either a brushed or brushless configuration, the operation of electric motors, to use electricity and magnetic fields to generate powered rotation of a rotor component, is well known and need not be explained in structural detail.

In recent years, both types of electric motors have been employed to provide lift and propulsion to unmanned aerial vehicles which are conventionally referred to as drones and vertical take-off and landing (eVTOL) aircraft, as well as piloted aircraft using electric motors to drive propellers. However, the ability to more accurately control the power and other operation of brushless electric motors has rendered them the favored electric motor configuration for both piloted and un-piloted aircraft.

Conventionally, when engaging electric motors to such aircraft, an annular housing, forming the stationary portion of the electric motor or the stator, surrounds the axial positioned rotor. The annular housing defining the stator must be engaged to a wing or other structure of the aircraft by a mount or similar component. Thereafter, when electric power is communicated to the mounted electric motor, the axial shaft, defining by conventional language, the rotor, which is positioned within the annular housing, rotates under power. A propellor, engaged to the rotating axially positioned rotor, will rotate to generate force to propel the aircraft.

With respect to the above, before explaining at least one preferred embodiment of the electric motor system herein, it is to be understood that the disclosed device and system are not limited in application to the details of employment and to the arrangement of the components or the steps set forth in the following description or illustrated in the drawings. The various apparatus and operations of the herein disclosed electric motor system herein are capable of other embodiments, and of being practiced and carried out in various ways, all of which will be obvious to those skilled in the art once the information herein is reviewed.

Also, it is to be understood that the phraseology and terminology employed herein are for the purpose of description, and should not be regarded as limiting. As such, those skilled in the art will appreciate that the conception upon which this disclosure is based, may readily be utilized as a basis for other electric motors employing an axial positioned stator component within an annular surrounding rotor. It is important, therefore, that the embodiments, objects, and claims herein be regarded as including such equivalent construction and methodology insofar as they do not depart from the spirit and scope of the present invention.

SUMMARY OF THE INVENTION

The disclosed device herein provides an electric motor, which has internal components to impart rotation to an annular rotor, which is rotationally engaged with and around a stator in a fashion noted above. The system is especially well suited for employment in combination with blade mounts, which slide onto the annular rotor to hold propellers for aircraft, which will revolve on the rotating portion of the motor.

Conventional, brushless electric motors are constructed with a permanent magnet rotor located inside of a wound stator. But one type of electric motor is designed with the rotor on the outside and the stator formed by a shaft, which is housed inside the rotor. Permanent magnets are mounted on the inner diameter of the rotor housing (sometimes referred to as the 'bell" or "cup"), and the rotor rotates around the internal stator, with windings. This design is often referred to as an external rotor motor, but can also be called an outer rotor motor, an outrunner motor, or a cup motor.

In all modes of the device and system herein, an electric motor with an annular housing functioning as the rotor in the form of an outrunner motor is employed where the annular housing surrounding a central fixed shaft forms and operates as the rotor. The annular housing forming this outrunner or rotor motor is operatively engaged with the elongated axially-positioned shaft forming the fixed portion of the motor and functions as the stator. By operatively engaged is meant that bearings and other conventional rotating connections engage the annular housing to the shaft, wherein a magnetic field generated within the housing will rotate the annular housing around the shaft. One such electric motor, for example, which is employable herewith and has such a housing operatively engaged to a shaft, is the model KDE5215 from KDE Direct located in Bend, Oregon. Of course, other motors of similar design and functionality, where the housing is rotated around a stationary central shaft, are available, which have a housing which can be engaged to a propeller mount in the manner herein disclosed, and such are anticipated.

As with conventional electric motors, the rotating annular housing is operatively supported by a number of bearings at the ends aligned with openings in the annular housing, (and potentially in the middle.) All components forming the electric motor, other than the rotor, are mechanically constrained to prevent movement while in rotational operation.

However, instead of conventional motor mounts engaged to the annular housing which functions to rotate as a rotor, in the rotor motor herein, mounting hubs are located to opposing ends of the axially positioned shaft forming the fixed stator. Such maintains the axially-positioned shaft in a fixed position relative to the annular housing rotating around it.

The inline mounted electric motor or rotor motor herein is thus comprised of a stator axially positioned within a rotating annular housing surrounding the axial shaft, where the annular housing functions as the rotor. In this configuration, the annular housing surrounding the axially positioned rotor, will rotate therearound using conventionally positioned internal components to generate the magnetic fields and constrained rotation, noted above. Conventional motor controllers are included, where required to control the speed, torque, and other conventional aspects of such an electric motor.

Electric power to the electric motor herein is communicated through an axial passage running in the stationary elongated shaft. Thus, electric power to generate the magnetic fields to cause rotation of the annular housing in the manner for electric motors, noted above, is communicated along wires running through the shaft, thereby leaving the annular housing to rotate freely.

An advantage of forming the stationary stator from the shaft is that the shaft forming the stator runs axially along the centerline of the surrounding rotating annular housing forming the rotor of the fully assembled motor. Consequently, mounting hubs to hold the axially positioned shaft stationary, and to mount it to the intended structure, are positioned upon opposite ends of the stationary shaft. This makes for an especially secure mount for the motor, which is also easy to engage and disengage such as, for example, on an airplane employing electric motors for propulsion.

Additional utility is provided by the mounting hubs at opposing ends of the axially positioned shaft of the device herein. This is because one or a plurality of motors can be engaged in a line or sequence, to each other. In such a configuration, one end of the axially positioned shaft is engaged to an adjacent hub of an adjacent motor and the opposite ends of the engaged motors are engaged to fixed positions on the vehicle or aircraft.

To hold the plurality of electric motors to an aircraft or other structure using electric motors for propulsion, a mounting hub, located at opposite ends of the plurality of engaged electric motors, is attached to a complimentary configured fixed mount on the aircraft or other vehicle.

Thus, a plurality of electric motors are mountable with each aligned with any adjacent such electric motor. Electric power to all electric motors in the sequence thereof, is along conventional wiring or electric pathways communicated from the power source and through a first or last electric motor in the series thereof through the aligned respective axially positioned shafts and engaged hubs to all electric motors which are engaged to each other.

Additionally included in the electric motor system herein are propeller hubs, which are configured to easily engage with the circumferential exterior surface of the rotating annular housings forming the rotor of each electric motor. This allows the user to engage any of a plurality of such propeller hubs, which are all configured for a fixed or removable engagement to the exterior of the annular housing.

Such hubs can be pre-configured with differing propeller configurations, such as differing numbers of propeller blades, differently shaped or pitched propeller blades, propeller blades of different flexure, propeller blades of different lengths and so on. Each such propeller hub will be configured to removably engage with the exterior of the annular hub and remain fixed thereon so long as so engaged. This allows users to easily replace not only the electric motors on their vehicle but also to reconfigure such electric motors with propeller assemblies of different operational characteristics.

Finally, in the mode of the device and system herein providing for modular motor engagement of electric motors and propeller blades, the electric motors can include a blade pitch adjustment system which is housed within the annular housing. Blade pitch adjustment can be actuated by a mechanical linkage configured to rotate the blade pitch horn and blades engaged within the blade grips. Alternatively, the rotation, to actuate blade pitch, can be provided by electric motors or the like operatively positioned within the annular housing of the motor.

With respect to the above description, before explaining at least one preferred embodiment of the herein disclosed electric motor system in detail, it is to be understood that the invention is not limited in its application to the details of construction and to the arrangement of the components in the following description or illustrated in the drawings. The invention herein described, is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based, may readily be utilized as a basis for designing of other electric motors and engageable propeller assemblies and methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Finally, the term "substantially" if not otherwise defined for size or dimension or positioning of a specific part or configuration, means plus or minus ten percent. Finally, by electric motor herein is meant any motor powered by electric current wherein the axial shaft is configured for fixed engagement to a mounted position and the housing operatively engaged to and encircling that shaft is the rotating component of the electric motor.

It is an object of this invention to provide an electric motor having a rotating annular housing forming or acting as a rotor which rotates around an axially positioned shaft forming a stator to provide for enhanced mounting thereof to an aircraft or the like using mount hubs on opposing ends of the axially positioned shaft.

It is an additional object of this invention to provide such an electric motor wherein they may be engaged in an inline plurality of electric motors, each engaged to the adjacent electric motor using such mounting hubs.

It is a further object of this invention to employ the electric motor to power propeller assemblies, which may be engaged to the exterior circumference of the rotating annular housing with a propeller mount thereon.

Another object of this invention is the provision of a modular system where electric motors adapted for propeller engagement to the annular housing can be easily mounted and dismounted from aircraft for replacement using hubs which engage with the aircraft itself or more particularly with mating hubs on the aircraft.

Yet another object of this invention is the provision of a plurality of propeller assemblies each in a different configuration and each having a mounting bracket configured to easily engage with the annular housing which rotates them.

Other objects, features, and advantages of the present electric motor system, as well as the advantages thereof over existing prior art, will become apparent from the description to follow, and are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features of the various modes of the propeller powering electric motor system herein, which, as noted, may be employed singularly or in combination. It is intended that the embodiments and figures disclosed herein are to be considered illustrative rather than limiting.

In the drawings:

FIG. 1 shows a side view of the electric motor of the system herein showing an annular housing which is operatively engaged with an axially positioned shaft of the electric motor and showing mounting hubs positioned on opposing ends of the axially positioned shaft to hold it stationary to the intended vehicle, such as an aircraft and showing blade mounts which engage to the rotating housing and propellers engaged thereto.

Figure 13:
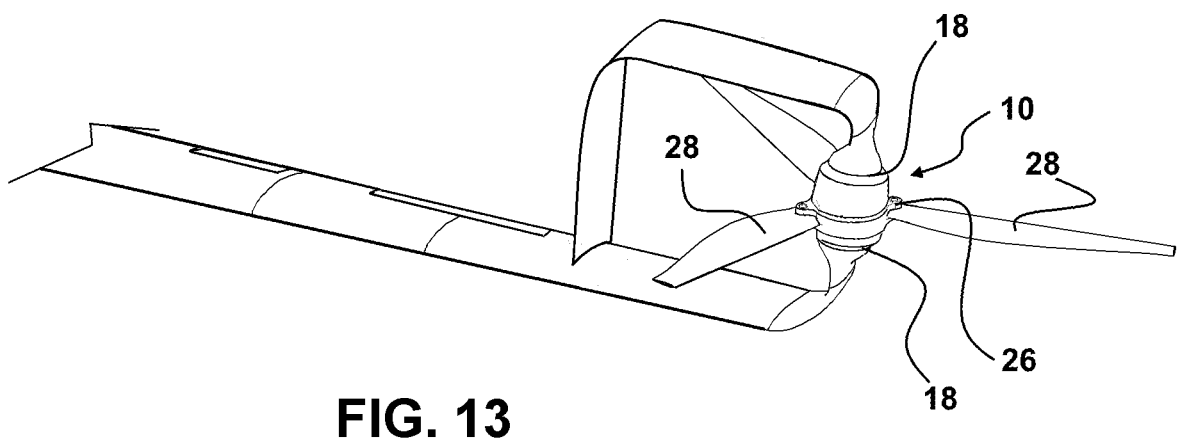

In FIG. 13 is shown another example of the electric motor of the system herein, as shown, is positioned in between a wing and winglet.

Other aspects of the disclosed electric motor system herein shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right, first, second, and other such terms refer to the device as it is oriented and appears in the drawings and are used for convenience only, and they are not intended to be limiting or to imply that the aircraft device has to be used or positioned in any particular orientation.

Figure 1:
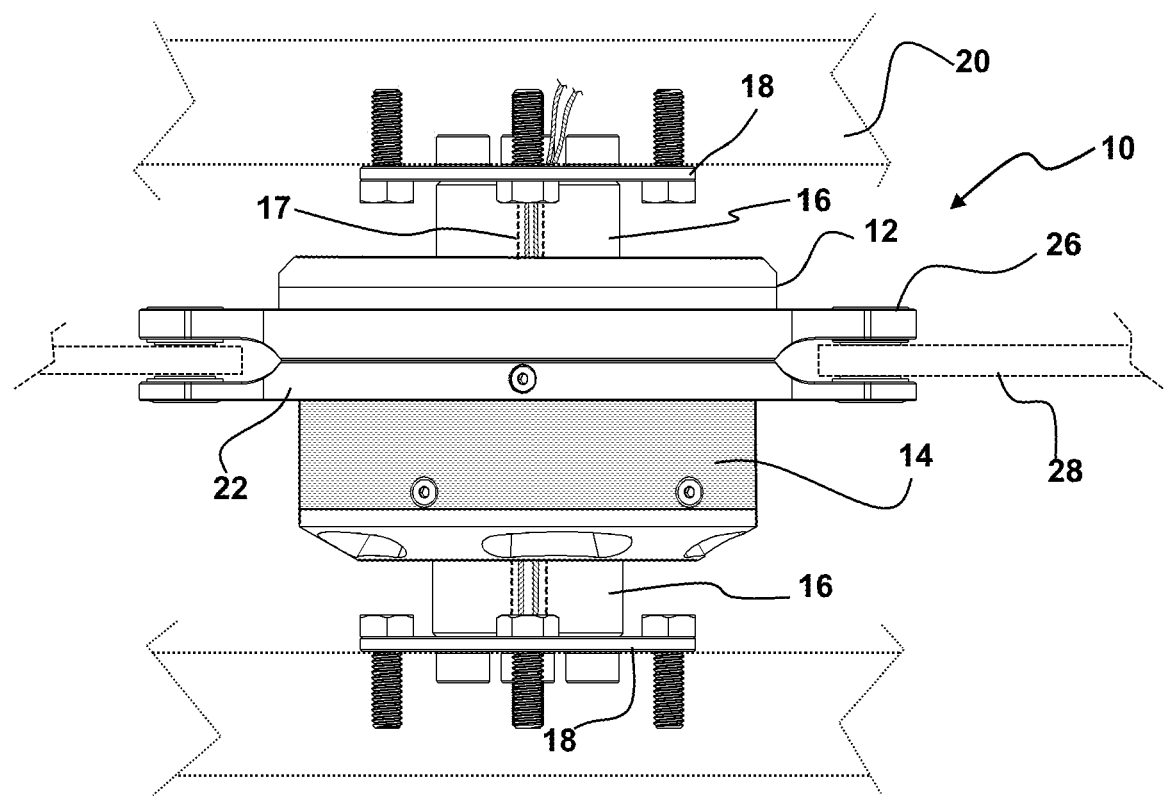

Now referring to drawings in FIGS. 1-13, wherein in FIG. 1 is shown a side view of the electric motor 12 of the motor system 10 herein. As depicted there is shown an annular housing 14 which is operatively engaged for operative rotation around an axially positioned shaft 16 of the electric motor 12. Also shown are mounting hubs 18 positioned on opposing ends of the axially positioned shaft 16 to hold it stationary to the intended vehicle such as an aircraft 20.

Figure 2:
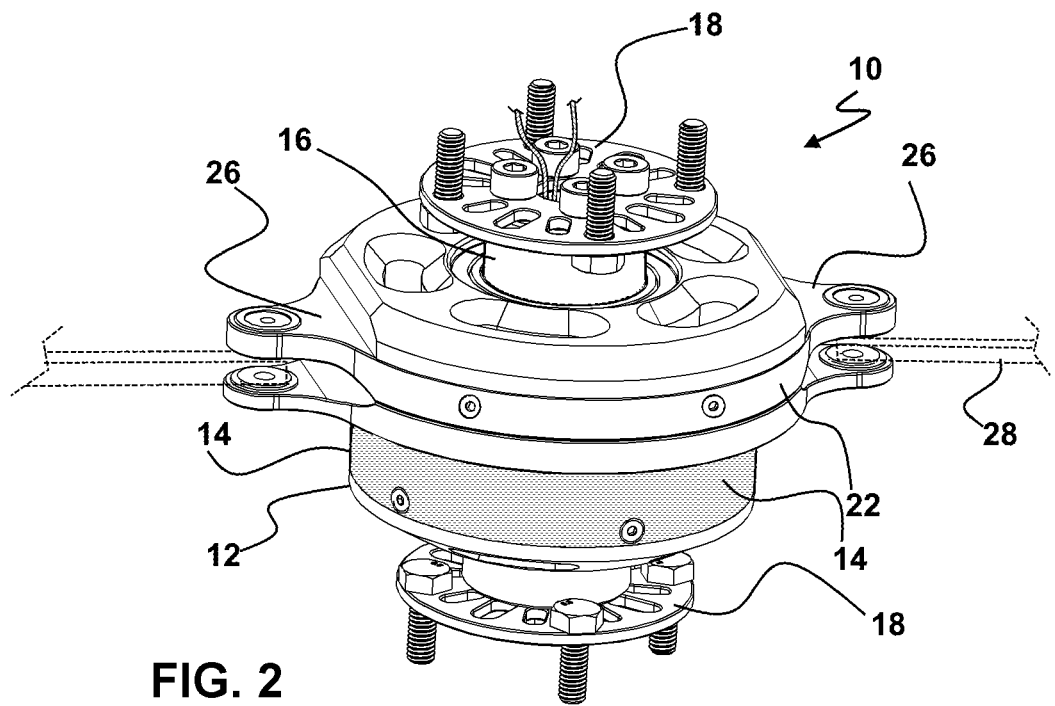
FIG. 2 is a perspective view of the electric motor device, as in FIG. 1, and also shows a perspective view of the propeller blade mounts which are engaged with the annular housing.
Figure 3:
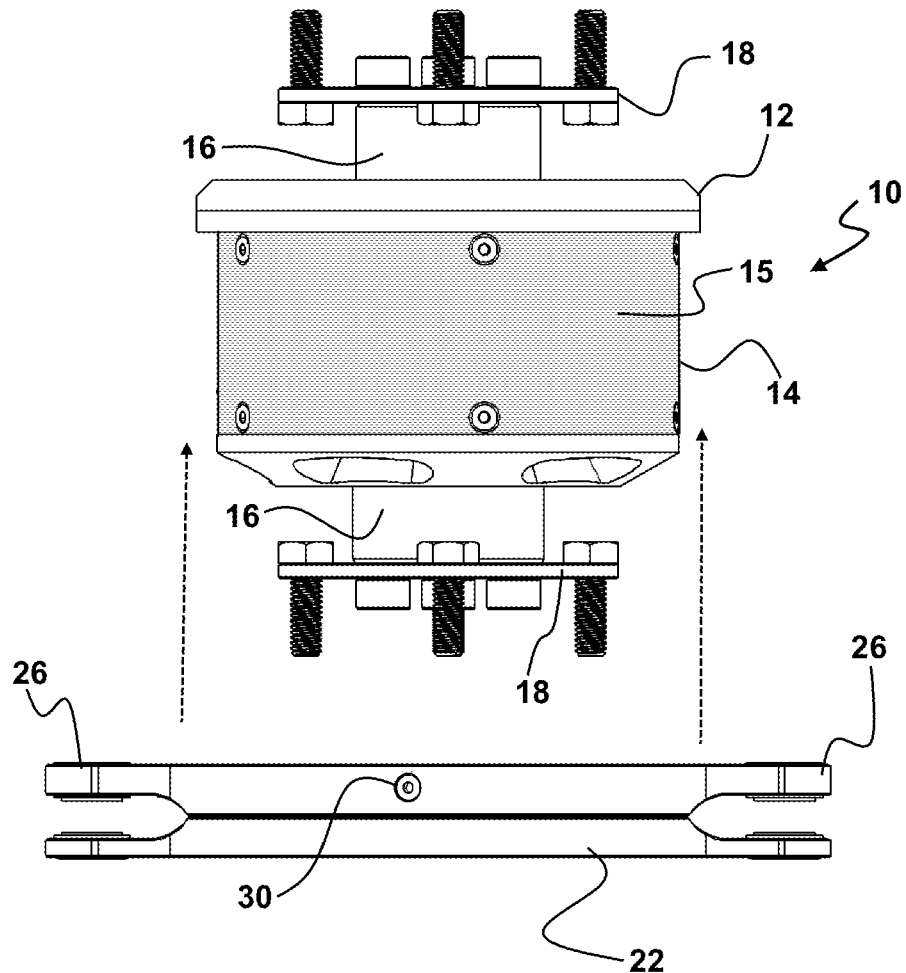
FIG. 3 depicts a side view of the electric motor of the system herein and shows an exploded view of one propeller hub from a plurality thereof where each is positionable to an engagement with the exterior circumference of the annular housing.

In FIG. 2, which is a perspective view of FIG. 1, is shown a view of the propeller assembly which has a bracket 22 configured for connection to the exterior circumferential surface of the annular housing 14. Such brackets 22 will be configured with an interior opening 24 (FIGS. 5-6) or other curved surface which will mate up the curved housing exterior surface 15. The brackets 22 can be a single piece having an opening 24 or may be formed in multiple components where engageable to the housing exterior surface 15. In a simplified mode of the motor system 10, with less utility, blade mounts 26 could be engaged to the cured exterior surface 15 of the annular housing 14, however the preferred mode of the motor system 10 employs the removably engageable brackets 22 having the blade mounts 26 for propeller blades 28 thereon to allow for easy replacement to quickly change pitch or propeller length or number, or to repair a damaged blade quickly.

Each propeller assembly will have a bracket 22 and one or a plurality of the blade grips or blade mounts 26 thereon. Each of the blade mounts 26 are configured for operative attachment to the mounting end of a propeller blade 28 (FIGS. 5-6), such as with pins or the like, in a conventional fashion. The propeller assemblies can be preassembled with propeller blades 28 which are engaged to blade mounts 26 which are engaged to the brackets 22 to allow for quick and easy changing or replacements of the propellers 28 on a motor.

This bracket 22 configuration is preferred for the propeller assemblies in that it allows for kits of brackets 22 to be assembled which each are sized with interior openings 24 to engage with the exterior surface 15 of the annular housing 14 of a group of motors 12 having the same circumferential size for the annular housing 14. In this manner, as for example shown in FIG. 3, a modular system is provided where the user can easily change the bracket 22 and propeller blades 28, when needed, by disconnecting the bracket 22 from the motor 12 and sliding or engaging a new bracket 22 thereon with propeller blades 28. The brackets 22 can be held to the housing 14 by bracket connectors 30, such as a set of screws. Alternatively, where the brackets 22 are formed of multiple sections, such as halves, they may be held by compressive engagement of half brackets to each other and concurrently form a compressive engagement upon the housing 14.

In all modes of the system 10, it is preferred that the motors 12 have mounting hubs 18 on at least one end of the shaft 16 such that the motor 12 can be engaged to an aircraft 20 or the like, by engaging the bracket 22 to the aircraft 20 such as on a wing or fuselage. Mating or complimentary mounts 32 will be provided on the aircraft 20 or vehicle which are configured for operative connection of the connectors of the mounting hub 18 and thereby the motor 12 thereto.

As shown in FIGS. 1 and 2, for example, bolts can be positioned on the mounting hub 18 which engage with complimentary threaded openings or nuts. As shown, for example, in FIGS. 7-9 the connector forming the mounting hub 18 on the shaft 16 can be configured with a shape to achieve a sliding or other complimentary engagement into a recess 34 or formed mating area on the aircraft 20 configured to removably engage the shaped sliding connector of the mounting hubs 18. Other mounting hub 18 configurations, as would occur to those skilled in the art, are anticipated in this application.

Figure 4:
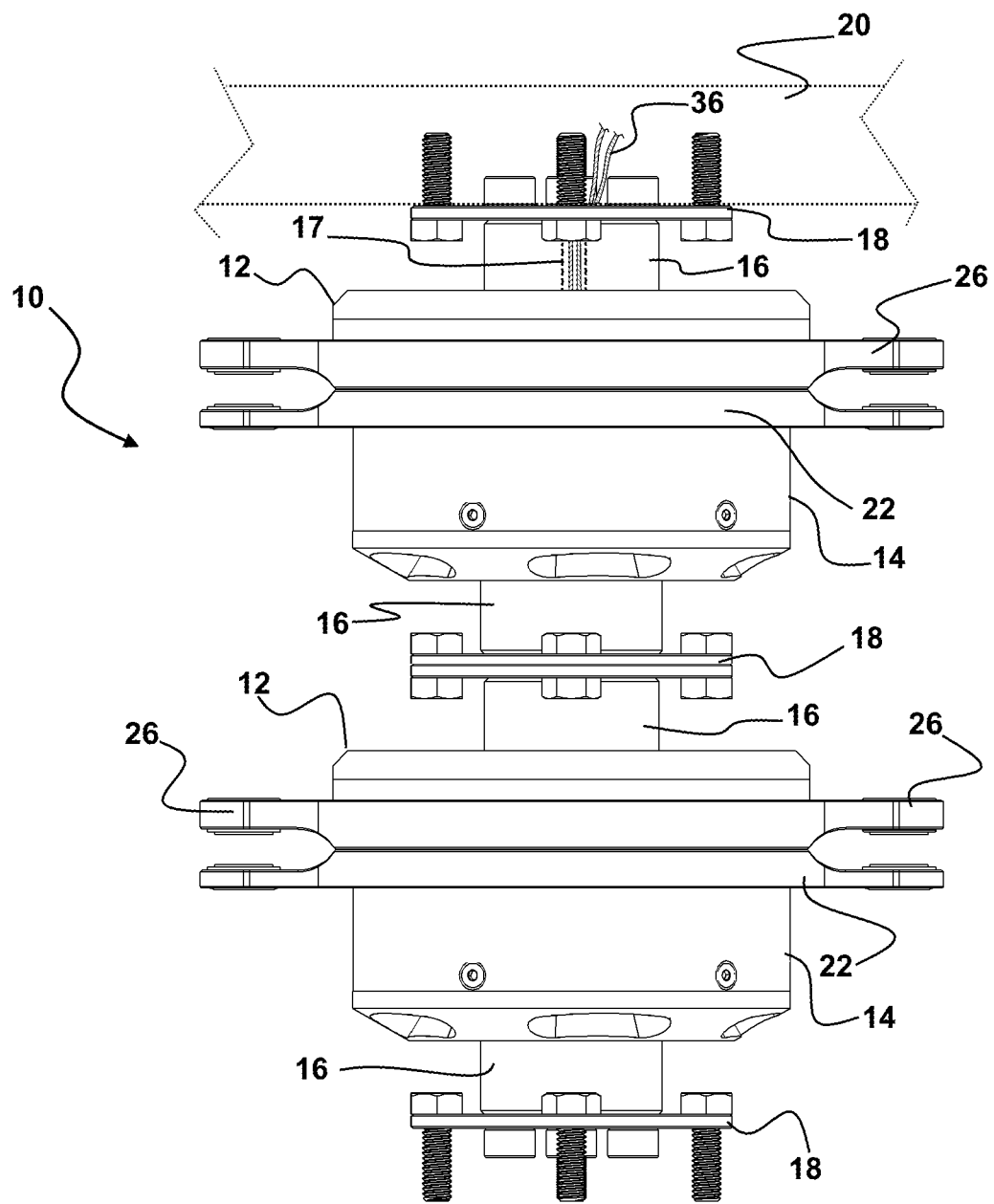
FIG. 4 depicts the inline engagement of a plurality of electric motors wherein adjacent electric motors having propellers connected to propeller hubs are engaged using connecting hubs, and the ends of the plurality of engaged motors have hubs thereon for engaging the inline plurality of motors to an aircraft.

In FIG. 4 is shown an inline engagement of a plurality of electric motors 12, formed to a motor assembly, to a vehicle, such as an aircraft. This inline engagement is enabled by the employment of the motors 12 herein, wherein the shaft 16 is in a fixed engagement to the vehicle, such as an aircraft, and the housing 14 rotates with the blade assembly thereon. As depicted further in FIG. 4, this configuration allows for the inline engagement of multiple motors 12 to each other using the mounting hubs 18 thereon into a motor assembly of a plurality of electric motors 12.

The motor assembly is engaged to the aircraft 20 or vehicle using the mounting hubs 18 located on the opposite ends of the motor assembly. Of course, each motor 12 in the motor assembly is configured for engagement of a propeller assembly thereon such as with the bracket 22 having one or a plurality of propeller blades 28. So engaged to the rotating annular housing 14 of each motor 12, when energized, the motor 12 will rotate the propeller blades 28.

As shown, electric current can be communicated to each of the motors 12 in the assembly of motors using conventional wires or circuits which communicate through an axial passage 17 running through each shaft 16. When needed or desired, an entire motor assembly can be removed from the aircraft 20 or vehicle. It can then be replaced easily with a new or newly configured motor assembly using the mounting hubs 18 on each end thereof.

Figure 5:
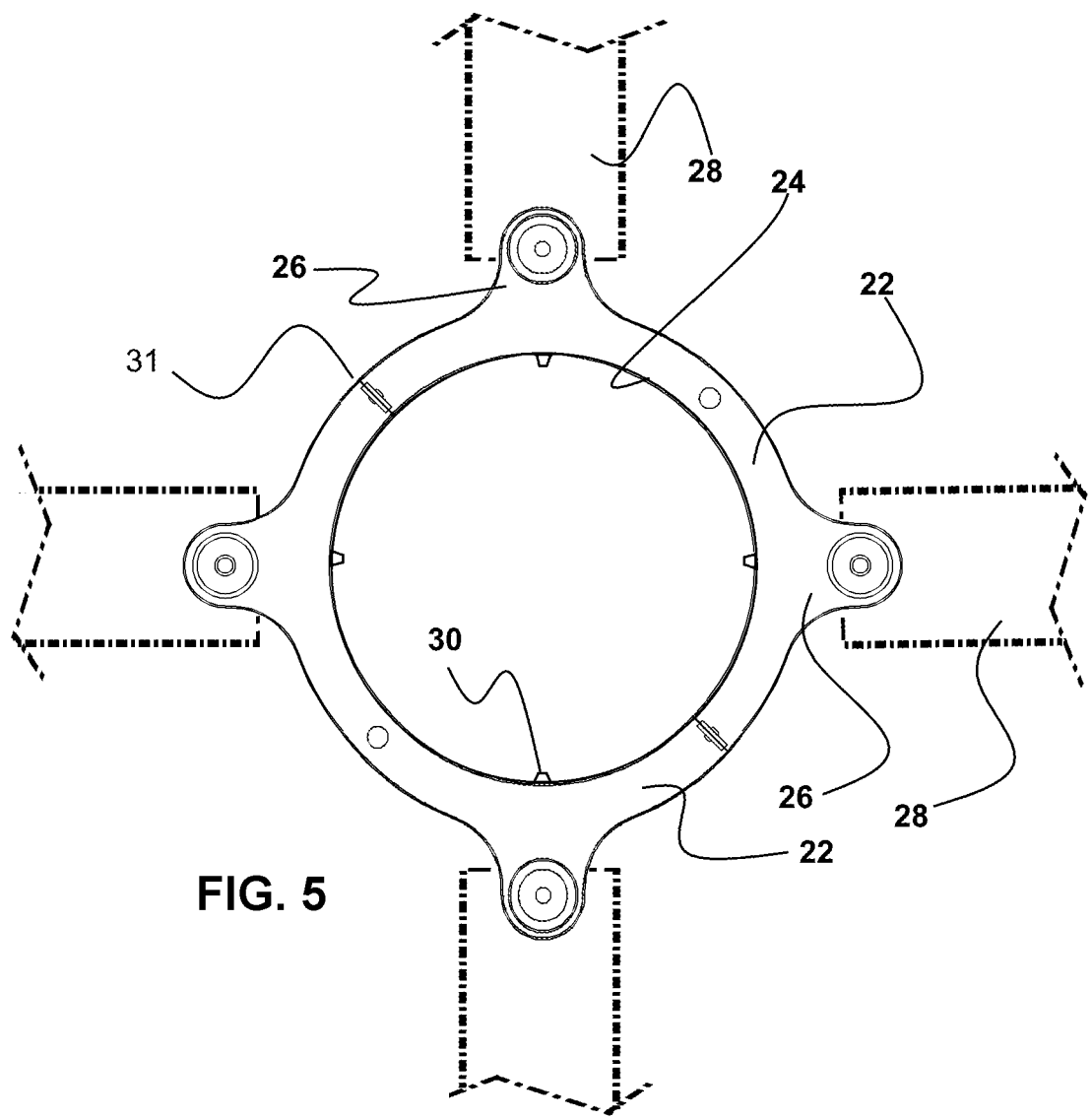
FIG. 5 shows an overhead view of a propeller hub having a central opening configured for engagement to a fixed position upon an annular housing and showing a plurality of four propeller blades which may be connected thereto.
Figure 6:
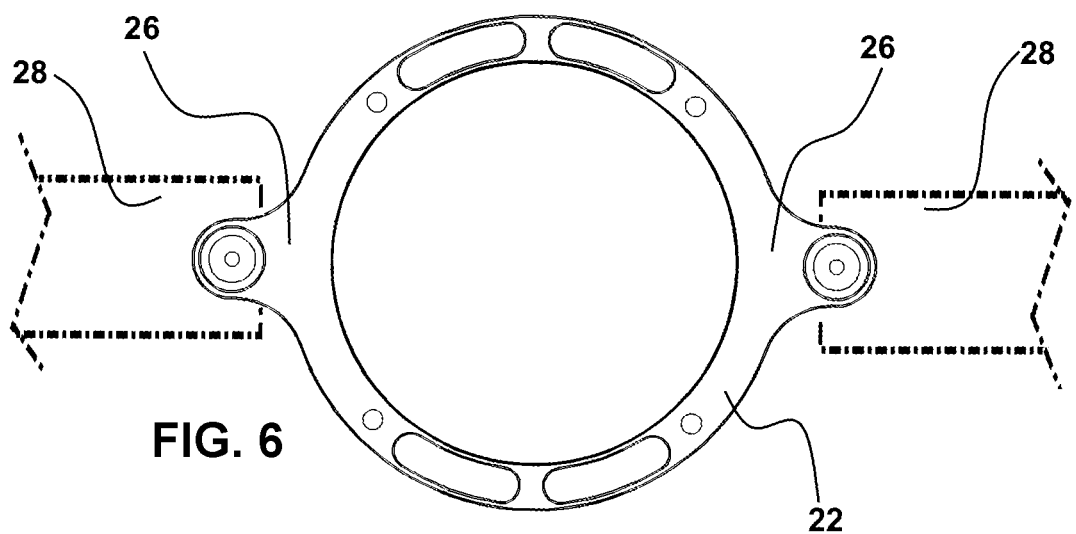
FIG. 6 depicts another configuration for a propeller hub having the same central opening configured to engage an annular hub of the electric motor herein, wherein only two blades are connected to the propeller hub.

Shown in FIGS. 5-6, as noted, are overhead views of propeller assemblies herein having propeller brackets 22 configured for a fixed engagement on the exterior of the annular housing 14.

The fixed engagement can just be compressive where the interior opening 24 is sized equal to or slightly smaller than the circumference of the exterior surface 15 of the annular housing 14. Each blade assembly may have one or a plurality of blade mounts 26 thereon for the engagement of propeller blades 28 operatively thereto. Each such bracket 22, as noted, is configured for an operative fixed connection to the exterior of the annular housing 14 of the motor 12 which rotates around the shaft 16. This fixed connection is preferably removable but could be permanent using welding or the like.

To resist slippage during rotation, bracket connectors 30 may be employed to hold the bracket 22 to mating recesses in the housing 14 or for example set screws engaged to the bracket may be used which engage apertures in the housing 14. Alternatively, as shown in FIG. 5, the brackets 22 can be formed in two halves which engage each other, such as with bracket connections 30, and concurrently form a compressed engagement of the opening 24 or surface against the exterior surface 15 of the housing 14.

Figure 7:
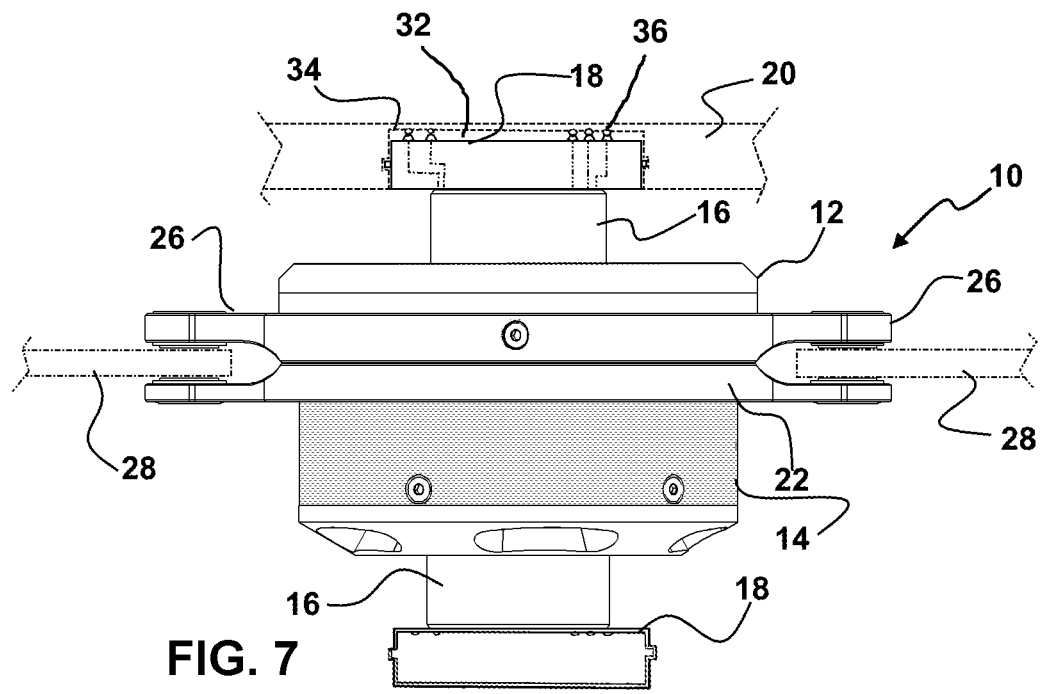
FIG. 7 shows a mode of the electric motor of the system herein, wherein the mounting hub engages into a socket adapted to hold it, wherein electric power for the electric motor is provided by mating connectors in the socket which communicate electric power and/or motor control signals to the electric motor.
Figure 8:
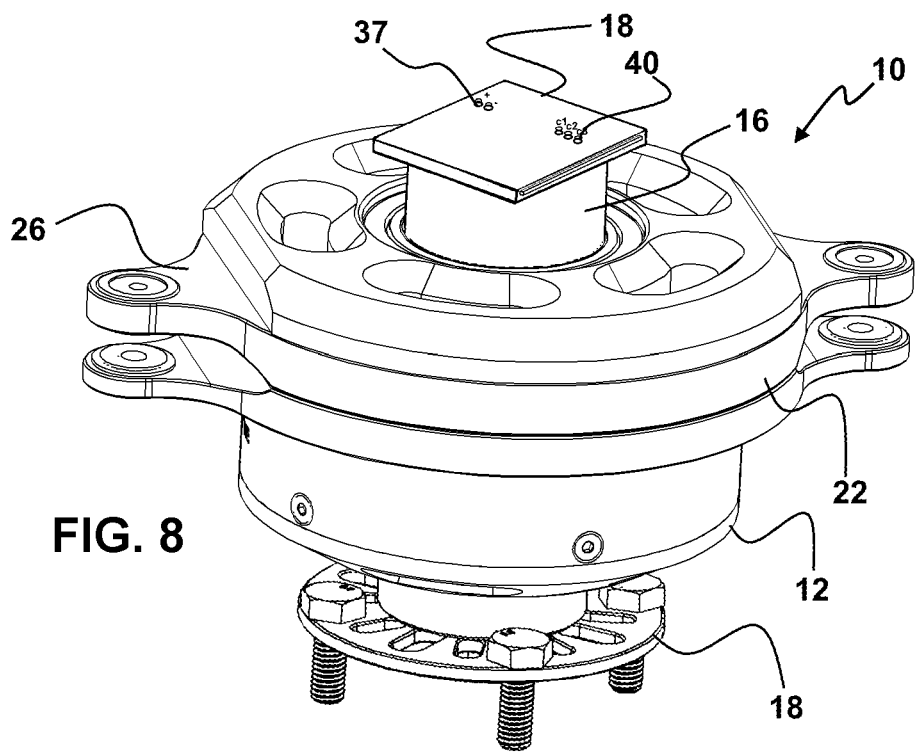
FIG. 8 shows an example of the motor configuration of FIG. 7, showing the socket engageable mounting hub on one end, and showing a second mounting hub on the opposing end configured to engage another inline motor or to engage with mating connections on the mounting position on the aircraft.
Figure 9:
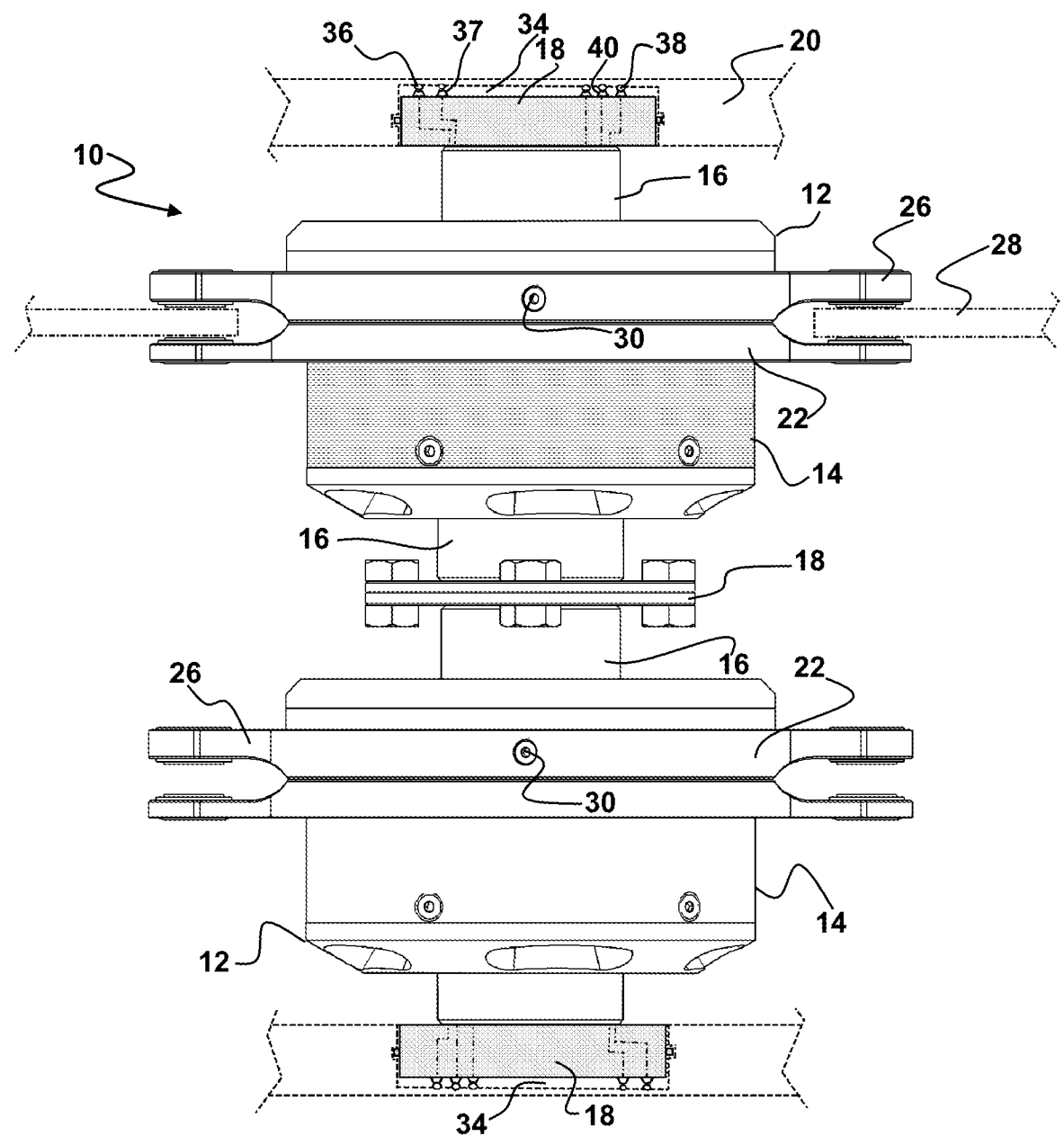
FIG. 9 depicts a side view showing a plurality of the electric motors herein having rotating annular housings where they are connected to each other by hubs having mating fasteners, and they are engaged to the aircraft by positioning the mounting hubs into sockets on the aircraft.

Shown in FIGS. 7-9 are modes of the system 10 herein, wherein the mounting hubs 18 are each configured as a bracket with an exterior shape which is configured to removably engage within a mount 32 formed on the vehicle or aircraft 20, such as a complimentary recess 34 or shoe or bracket. As shown in this mode, in a manner employable on other modes of the mounting hubs 18 herein, electric power is provided to the motor by electric connectors or wires 36 or the like which are positioned within the recess 34 to operatively align with and contact mating wires or mating electric connectors 37, which are connected to the circuit communicating electric power to the motors 12. Using such an electric connector system, whenever a mounting hub 18 of a motor engages with a vehicle, such as an aircraft 20, electric power is automatically connected to the motor, once a mounting hub 18 is connected to it.

Additionally shown are control connectors 38 which will align with and contact against mating control connectors 40 when the hub 18 is engaged to a mount on a vehicle such as within the recess 34 shown. Other configurations of control connectors 28 which will automatically mate with mating control connectors 40 may be configured to work with any style of the mounting hubs 18 so long as once the mounting hub 18 is properly connected to the vehicle, they align and contact.

The control connectors 38 will communicate control signals to the motor 12 having a motor controller which are conventional to modern brushless motors to control its operation during use as is done with many electric motors. This allows the user to control the motor 12 such as for torque or rotation speed and other functional aspects during use. The wiring or circuits to the interior control modules and circuits of the motors 12 is routed through the axial passage 17. The configurations of FIGS. 8-9 makes it easy to engage and replace one or a plurality of inline motors 14 in a slide-in or screw-in or snap-in or other removable engagement of the mounting hubs 18 which are configured to engage a complimentary shaped receiver such as a recess or socket or slot or the like, or similar configurations where bolts or other connectors hold the mounting hubs 18 in position on a vehicle such as an aircraft 20.

Figure 10:
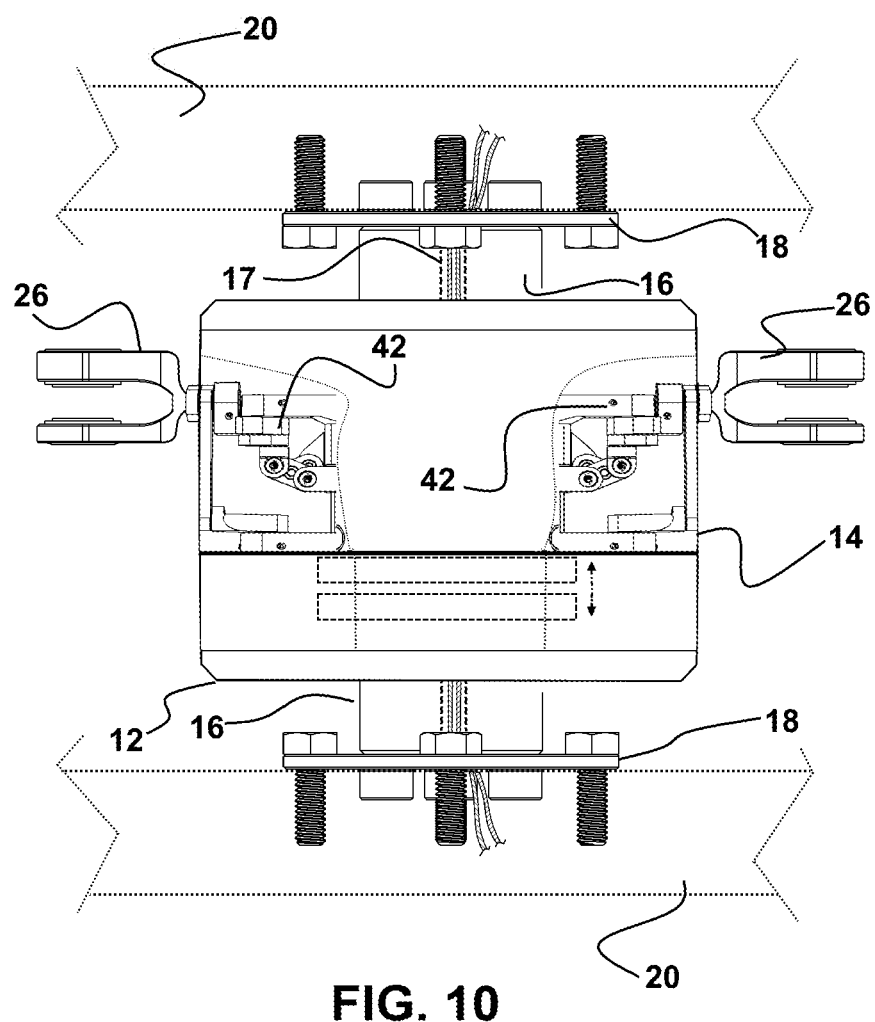
FIG. 10 depicts a mode of the device and system herein, wherein a blade pitch actuation system is housed internally to provide for pitch angle adjustment of the blades.

Shown in FIG. 10 is a mode of the system 10 herein, wherein a blade pitch actuator 42 is operatively engaged to the blade mount 26, such as with a change horn or other means to angularly rotate the blade mount 26 and any propeller blade 28 connected thereto and change the angle of attack of the propeller blade 28. The positioning of the pitch actuator 42 within the interior of the housing 14 both protects it from impacts and damage as well as rendering the motor 12 more aerodynamic during rotation then with the pitch actuator 42 on the exterior. While shown as a conventional pitch actuator 42, using mechanical action of a swash plate or the like, electric actuators may also be employed such as small electric motors operatively engaged to rotate the blades engaged to the blade mounts 26 or rotate the blade mounts 26 themselves, to change the angle of attach of each propeller blade 28 as needed. Signals to control this actuation can be communicated through the control connectors 28 and circuits.

Figure 11:
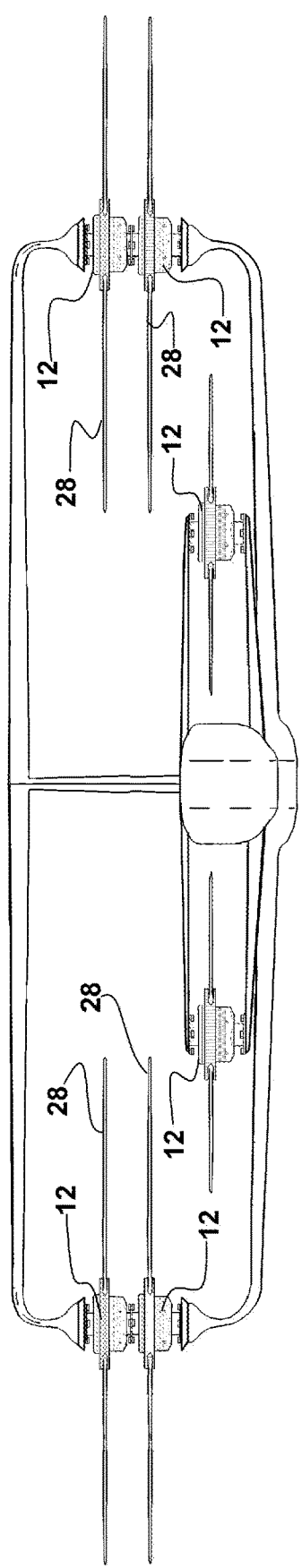
FIG. 11 shows an example of a plurality of inline electric motors of the system herein are operatively engaged between two mounting points on an aircraft which may be wings or fixed struts extending from the fuselage and also shows a mounting of a single electric motor with propellers engaged between two mounting points.

In FIG. 11 is depicted an example of a plurality of inline electric motors of the system herein engaged to a vehicle such as an aircraft 20 as in FIG. 4, for example. The inline engaged plurality of motors 12 are connected operatively to propeller blades 28 using propeller blade assemblies such as the brackets 22. This inline configuration may be operatively engaged between two mounting points for the appropriate mounting hubs 18 on an aircraft 20 which may be wings or fixed struts extending from the fuselage. Also shown, for example only, is a single electric motor 12, as in FIG. 1, having the propeller blades 28 extending from blade mounts 26 or a bracket 22 where the single motor 12 has opposing mounts 18 engaged between two mounting points on the aircraft 20 or vehicle.

Figure 12:
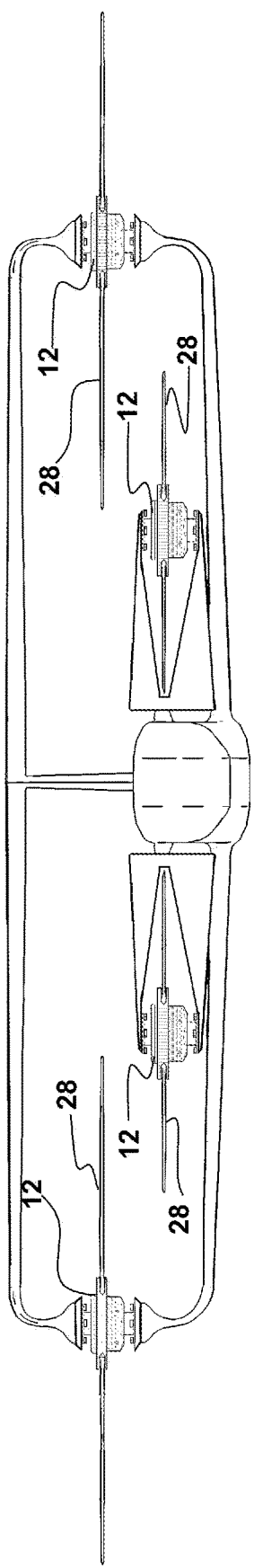
FIG. 12 shows an example of mounting of the electric motors herein, wherein single electric motors having propellers thereon are engaged between two points on wings or struts by mounting hubs on opposite ends of the axial positioned shaft, and single electric motors are engaged to canards.

Shown in FIG. 12 is an example, in no way limiting, of mounting of the electric motors 12 herein, wherein single electric motors as for example in FIG. 1, are engaged by the opposing mounting hubs 18 to complimentary mounting points on wings or struts. Also shown, for an example, are a single electric motor 12, as in FIG. 1-2 wherein the mounting hubs 18 on opposing ends thereof are engaged to canards.

In FIG. 13 is shown another example of the electric motor of the system herein as in FIG. 11 for example. The motor, as shown, is positioned at the end of a wing having control surfaces and is operatively engaged with opposing hubs 18 which are connected on one side to a winglet and on the other side to a wing. Power communication and control communication would be as noted above. The configuration of FIG. 12 might also be used for other purposes such as at the distal end of a rotating windmill blade.

The electric motor system herein having rotating annular housings which engage one or a plurality of different propeller hubs, while disclosed for employment on aircraft has other applications, and one skilled in the art could discern such. The explication of the features of this invention does not limit the claims of this application, and, other applications developed by those skilled in the art upon reviewing this application are considered to be included in this invention.

It is additionally noted and anticipated that although the electric motor system herein is shown in its most simple form and potential configurations, various components and aspects of the disclosed electric motor system may be differently shaped or slightly modified when forming the invention herein. As such, those skilled in the art will appreciate the descriptions and depictions set forth in this disclosure are merely meant to portray examples of preferred modes of construction and configuration and engagement of the electric motors herein within the overall scope and intent of the invention, and are not to be considered limiting in any manner.

Further, while all of the fundamental characteristics and features of the electric motor invention have been shown and described herein, with reference to particular embodiments thereof, a latitude of modification, various changes and substitutions are intended in the foregoing disclosure as well as the claims which follow, and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An electric motor apparatus powering a propeller, comprising:
    an electric motor having a shaft forming an inner stationary stator and having an annular housing operatively engaged to and surrounding said shaft, said housing including a curved exterior circumferential surface rotating around said shaft upon communication of electric power to said electric motor;
    at least one bracket having an interior opening sized equal to a circumference of the curved exterior circumferential surface, the interior opening configured to removably mate with the curved exterior circumferential surface by sliding thereon;
    a plurality of blade mounts positioned on said at least one bracket;
    a plurality of propeller blades, each of said propeller blades having a first end engaged to a respective said blade mount; and
    said shaft having a first mounting hub located on at least one end thereof, said first mounting hub for connecting said shaft to a fixed position on a first mount on an aircraft.

2. The electric motor apparatus of claim 1, wherein the at least one bracket is held to the curved exterior circumferential surface by bracket connectors.

3. The electric motor apparatus of claim 2 additionally including:
    a plurality of said at least one bracket; and
    each of said plurality of said at least one bracket having a respective said propeller blade engaged to each of said plurality of blade mounts to form a propeller assembly, whereby each propeller assembly is positionable to said annular housing.

4. The electric motor apparatus of claim 3 additionally including:
    said shaft having an axial passage communicating to an opening at said first mounting hub;
    said axial passage having wires therein for communicating said electric power to said electric motor.

5. The electric motor apparatus of claim 4 additionally including:
    said shaft having said first mounting hub located on a first end thereof and having a second mounting hub engaged on a second end thereof opposite said first end;
    said second mounting hub for connecting said shaft to a fixed position on a second mount on said aircraft.

6. The electric motor apparatus of claim 3 additionally including:
    said shaft having said first mounting hub located on a first end thereof and having a second mounting hub engaged on a second end thereof opposite said first end;
    said second mounting hub for connecting said shaft to a fixed position on a second mount on said aircraft.

7. The electric motor apparatus of claim 2 additionally including:
    said shaft having an axial passage communicating to an opening at said first mounting hub;
    said axial passage having wires therein for communicating said electric power to said electric motor.

8. The electric motor apparatus of claim 7 additionally including:
    said shaft having said first mounting hub located on a first end thereof and having a second mounting hub engaged on a second end thereof opposite said first end;
    said second mounting hub for connecting said shaft to a fixed position on a second mount on said aircraft.

9. The electric motor apparatus of claim 2 additionally including:
    said shaft having said first mounting hub located on a first end thereof and having a second mounting hub engaged on a second end thereof opposite said first end;
    said second mounting hub for connecting said shaft to a fixed position on a second mount on said aircraft.

10. The electric motor apparatus of claim 1 additionally including:
    said shaft having an axial passage communicating to an opening at said first mounting hub;
    said axial passage having wires therein for communicating said electric power to said electric motor.

11. The electric motor apparatus of claim 10 additionally including:
    said shaft having said first mounting hub located on a first end thereof and having a second mounting hub engaged on a second end thereof opposite said first end;
    said second mounting hub for connecting said shaft to a fixed position on a second mount on said aircraft.

12. The electric motor apparatus of claim 10 additionally including:
    a pitch actuator connecting each said blade mount to said annular housing; and
    each said pitch actuator for adjusting an angle of attack of a respective said propeller blade engaged with said blade mount.

13. The electric motor apparatus of claim 10 additionally including:
    said first mount being a recess and said first mounting hub formed as a bracket slidingly engageable in said recess.

14. The electric motor apparatus of claim 1 additionally including:
    said shaft having said first mounting hub located on a first end thereof and having a second mounting hub engaged on a second end thereof opposite said first end;
    said second mounting hub for connecting said shaft to a fixed position on a second mount on said aircraft.

15. The electric motor apparatus of claim 14 additionally including:
    a pitch actuator connecting each said blade mount to said annular housing; and
    each said pitch actuator for adjusting an angle of attack of a respective said propeller blade engaged with said blade mount.

16. The electric motor apparatus of claim 1 additionally including:
    a pitch actuator connecting each said blade mount to said annular housing; and
    each said pitch actuator for adjusting an angle of attack of a respective said propeller blade engaged with said blade mount.

17. The electric motor apparatus of claim 1 additionally including:

said first mount being a recess and said first mounting hub formed as a bracket slidingly engageable in said recess.

18. An electric motor apparatus powering a propeller, comprising:
- an electric motor having a shaft forming an inner stationary stator and having an annular housing operatively engaged to said shaft, said housing including a curved exterior circumferential surface rotating around said shaft upon communication of electric power to said electric motor;
- a plurality of blade mounts positioned on a bracket, the bracket including an interior opening slidable to a position on said curved exterior circumferential surface and fixed in said position on said curved exterior circumferential surface using bracket connectors;
- a plurality of propeller blades, each of said propeller blades having a first end engaged to a respective said blade mount; and
- said shaft having a first mounting hub located on at least one end thereof, said first mounting hub for connecting said shaft to a fixed position on a first mount on an aircraft.

* * * * *